(12) United States Patent
Frank et al.

(10) Patent No.: US 7,612,799 B1
(45) Date of Patent: Nov. 3, 2009

(54) HUMIDITY CONTROL SYSTEMS AND METHODS FOR INFRARED CAMERAS

(75) Inventors: Jeffrey D. Frank, Santa Barbara, CA (US); Marcel Tremblay, Goleta, CA (US); James T. Woolaway, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 191 days.

(21) Appl. No.: 11/946,805

(22) Filed: Nov. 28, 2007

(51) Int. Cl.
*H04N 5/33* (2006.01)

(52) U.S. Cl. ............... 348/164; 348/162; 250/330; 250/339.03; 250/339.04

(58) Field of Classification Search .......... 396/275; 250/330, 339.03, 339.04; 348/162, 164
See application file for complete search history.

(56) References Cited

U.S. PATENT DOCUMENTS

| 6,023,061 | A | * | 2/2000 | Bodkin | 250/332 |
| 6,061,087 | A | * | 5/2000 | Schieltz et al. | 348/151 |
| 2005/0206780 | A1 | * | 9/2005 | Iwasaki et al. | 348/373 |

* cited by examiner

*Primary Examiner*—W B Perkey
*Assistant Examiner*—Warren K Fenwick
(74) *Attorney, Agent, or Firm*—Haynes and Boone LLP

(57) ABSTRACT

An infrared camera, in accordance with one embodiment, includes a housing having disposed therein one or more heating elements; a vent; a sensor for detecting a humidity level and providing a sensor signal indicating the humidity level within the housing; and a logic circuit configured to receive the sensor signal and determine if the humidity level within the housing should be reduced, wherein the logic circuit provides a control signal to switch on at least one of the heating elements if the humidity level should be reduced via the vent.

25 Claims, 4 Drawing Sheets

HUMIDITY CONTROL SYSTEMS AND METHODS FOR INFRARED CAMERAS

TECHNICAL FIELD

The present disclosure generally relates to humidity control and, more particularly, to active humidity control systems and methods for infrared cameras.

BACKGROUND

Management of humidity in infrared cameras is important for the control of, among other things, corrosion that may be detrimental to sensitive electronics. In this regard, an undesirable change in the humidity level or a persistent, undesirable humidity level may impact the electronics disposed within the infrared camera and may reduce the performance of the infrared camera.

Environmental conditions may affect the humidity levels within the infrared camera. For example, rain or moisture may cool down an infrared camera, which may create a vacuum inside the housing of the infrared camera. To equalize the pressure, air and moisture may be drawn into the interior of the housing, where the moisture may condense and eventually cause corrosion to form on the sensitive electronic components or impair infrared camera performance.

As a result, there is a need for techniques for controlling humidity within infrared cameras.

SUMMARY

Systems and methods are disclosed herein, in accordance with one or more embodiments, to provide humidity control for infrared cameras. In accordance with one embodiment, an infrared camera includes a housing having disposed therein; one or more heating elements; a vent; a sensor for detecting a humidity level and providing a sensor signal indicating the humidity level within the housing; and a logic circuit configured to receive the sensor signal and determine if the humidity level within the housing should be reduced, wherein the logic circuit provides a control signal to switch on at least one of the heating elements if the humidity level should be reduced via the vent.

In accordance with another embodiment, a method of controlling a humidity level within an infrared camera includes detecting the humidity level within the infrared camera; determining if the detected humidity level should be adjusted; and switching on at least one heating element within the infrared camera if the humidity level is to be reduced based on the determining.

In accordance with still another embodiment, an infrared camera includes a housing; a vent coupled to the housing; means for detecting a humidity level within the housing; means for generating heat within the housing; means for determining if the humidity level within the housing should be adjusted based on information provided by the detecting means, wherein the determining means provides a control signal to switch on the heat generating means if the humidity level should be reduced.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure are best understood by referring to the detailed description that follows. It should be appreciated that like reference numerals are used to identify like elements illustrated in one or more of the figures.

DETAILED DESCRIPTION

Figure 1:
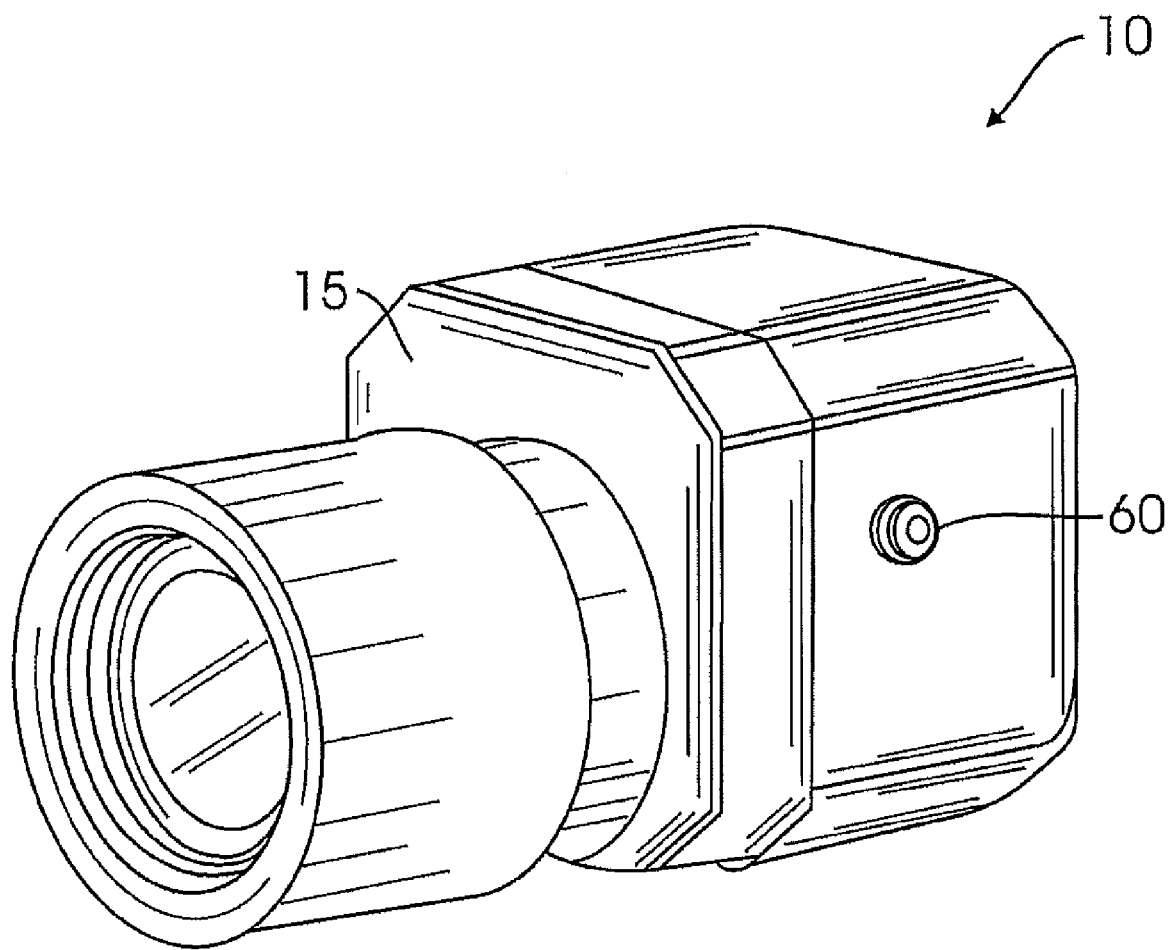
FIG. 1 is a perspective view generally showing an infrared camera having a vent as part of a humidity reduction system in accordance with one embodiment.

FIG. 1 is a perspective view generally showing an infrared camera 10 having a housing 15 with a vent 60 (e.g., a moisture or humidity vent) for use with a humidity reduction system incorporated within infrared camera 10, as discussed further herein. The term "humidity" is a broad term, as used herein, and generally considered to include moisture, water, condensation, and the like.

Infrared cameras are increasingly used in a variety of applications and environmental conditions. For example, infrared camera 10 may be employed for any desired type of infrared camera application and is not limited to any specific exemplary embodiment. As an example, infrared camera 10 may be portable and/or implemented within an infrared camera system of a motorized vehicle (e.g., an automobile), an aircraft (e.g., airplane or spacecraft), a watercraft (e.g., a cargo ship), or as part of a security, surveillance, or monitoring system. However for sensitive electronics disposed within housing 15 (e.g., an enclosure), condensation, due to humidity intrusion or other factors which may depend upon the application or environmental condition, may eventually cause corrosion to form on sensitive electronic components and/or performance degradation of infrared camera 10. For example, corrosion is typically detrimental and may cause component failure if not repaired or prevented.

Similarly, very low humidity levels within housing 15 may be undesirable as the dry air may increase the risk of electrostatic discharge (ESD) between the electronic components. As such, management/control of humidity levels within an acceptable humidity range is important to help ensure continued operation of the electronic components disposed within housing 15 and/or proper performance of infrared camera 10.

Figure 2:
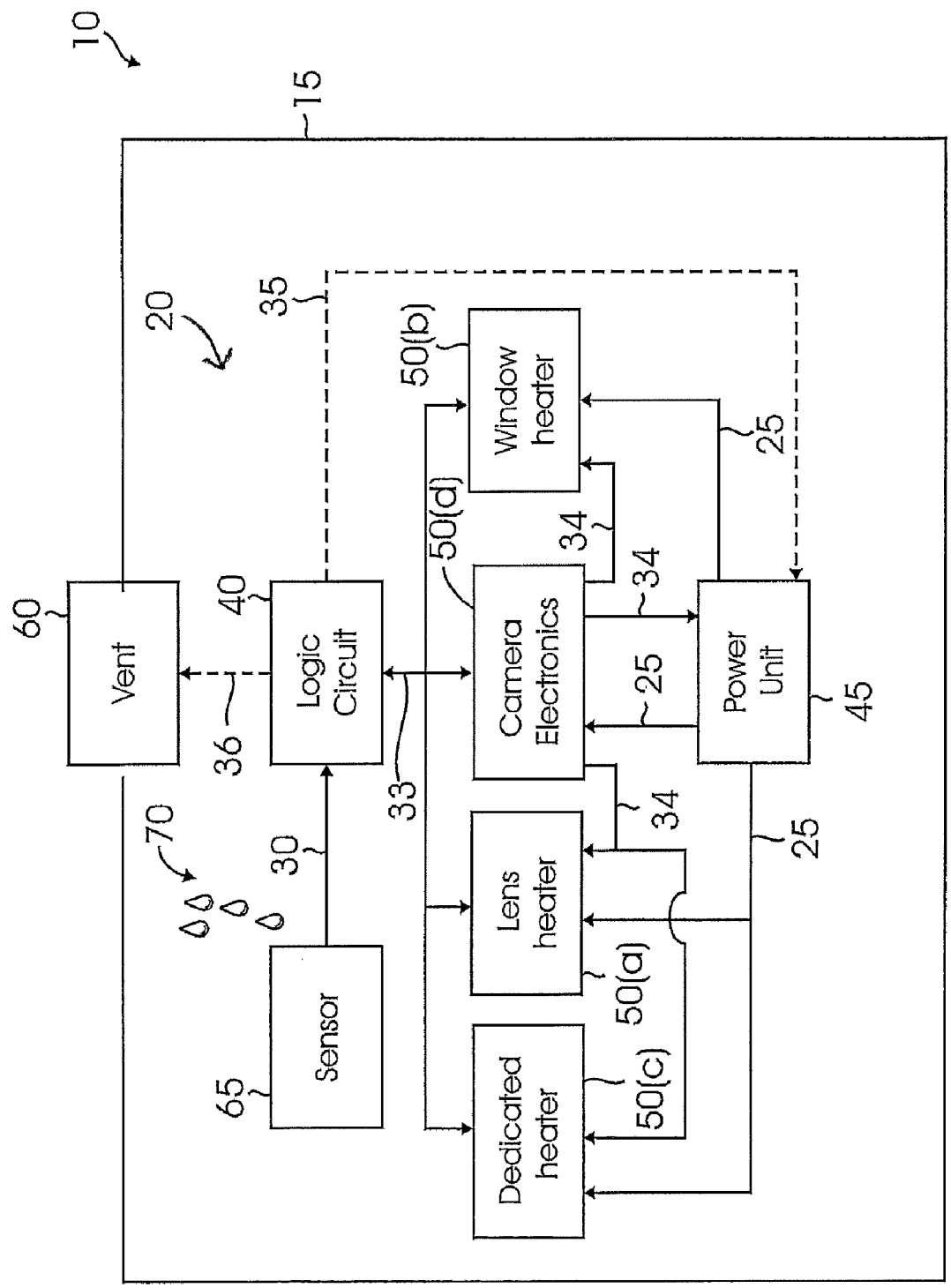
FIG. 2 is a system functional block diagram of a humidity reduction system, such as for the infrared camera of FIG. 1, in accordance with one embodiment.

Accordingly, FIG. 2 shows a functional block diagram of a humidity reduction system 20 for use with infrared camera 10 in accordance with one embodiment. Although humidity reduction system 20 is described in accordance with one embodiment as being associated with and sharing certain functional components or conventional elements of infrared camera 10, persons skilled in the art will understand that other components or elements generally associated with conventional infrared cameras may be present in infrared camera 10, without contributing to the structure or function of humidity reduction system 20, and their discussion is generally omitted for clarity of discussion.

In one embodiment, humidity reduction system 20 described herein may be considered a closed loop control system that controls the activation (switching on) or deactivation (switching off) of various heaters or heat generating elements 50(a)-50(d) within housing 15 as a function (at least partially) of a sensor signal 30 from a sensor 65 (e.g., a humidity or moisture sensor). In this regard, humidity reduction system 20 disposed within housing 15 of infrared camera 10 includes sensor 65, vent 60, and a logic circuit 40, which may control (at least partially) activation and deactivation (e.g., either directly or via a power unit 45) of one or more heating elements 50(a)-50(d).

Sensor 65 may be configured to monitor humidity within housing 15 and provide a sensor signal 30 that provides information with respect to a humidity level (e.g., as illustrated by humidity or humidity level 70) within housing 15. The choice of sensor 65, as well as other system related components or elements, such as vent 60, will typically depend on a variety of factors including for example cost, size, reliability, sensitivity requirement, and/or intended application. In general, sensor 65 may represent any type of humidity sensor.

In this regard, one example of sensor 65 may include a capacitive humidity sensor produced by thin film technology. A capacitive humidity sensor of this type is typically structured much like a plate capacitor in that the sensor utilizes conductive plates formed on a dielectric film to form a capacitor that is sensitive to the amount of moisture in the air. The active portion of the sensor changes its dielectric constant as it absorbs atmospheric moisture, which in turn varies the sensor's capacitance in proportion to changes in relative humidity.

As another example of sensor 65, a resistive sensor may be appropriate for humidity detection. Resistive humidity sensors generally work by using a moisture-sensitive material on an interdigitated (interlocked or overlapped) electrode substrate. The device's resistance varies exponentially with variations in relative moisture.

In one embodiment, the amount of humidity (e.g., humidity level 70) detected by sensor 65 may be communicated via sensor signal 30 to logic circuit 40. Logic circuit 40 may represent a simple logic circuit (e.g., a low power logic circuit) to provide functionality as discussed herein or may represent a more complicated control device such as a microcontroller, a programmable logic device, or even a processor or similar type of device (e.g., capable of executing an instruction set). Logic circuit 40 interfaces with sensor 65 and one or more components within housing 15, as discuss herein, to provide control functionality for humidity reduction system 20. For example, logic circuit 40 may control humidity levels within housing 15 by using information provided by sensor 65 and activating and/or deactivating one or more heating elements 50(a)-50(d) as needed, and possibly also controlling power unit 45 and vent 60.

Power unit 45 may include a circuit board power subsystem (e.g., a power board) configured to provide, among other things, various power conversion functions and desired power on-off switching, as well as one or more power supply voltages 25 to one or more heating elements 50(a)-50(c) including camera electronics 50(d) for operation of infrared camera 10. Persons skilled in the art will understand that power unit 45 may be configured and controlled by an infrared camera microprocessor (or equivalent logic device), not shown but understood to be included within camera electronics 50(d), to control power supply voltages 25 to any number of the one or more heating elements 50(a)-50(d) at any given time as needed. As further explained below, power unit 45 may be further configured to receive control signals 35 from logic circuit 40. Power unit 45 may be configured to interface to a battery or external power supply (not shown), as may be desired and understood by one skilled in the art, such as for example when employing infrared camera 10 within a motorized vehicle, security, surveillance, and/or monitoring infrared camera application.

One or more heating elements 50(a)-50(d) may include for example, an infrared lens heater 50(a), an infrared window heater 50(b), an optional heater 50(c) (e.g., a dedicated heater whose primary purpose is to provide heat), and/or camera electronics 50(d), which may be powered up during normal operation of infrared camera 10, but may be utilized independent of infrared camera operation as needed (e.g., in a standby mode) to provide heat under control of humidity reduction system 20. Thus as an example in accordance with an embodiment, logic circuit 40 may represent a low power control circuit that may operate to control humidity levels within infrared camera 10, regardless of whether infrared camera 10 is operating to obtain infrared images, by controlling various heat-generating elements within infrared camera 10. As noted, the heat-generating elements may include, for example, conventional infrared camera components, such as lens or window heaters, the infrared camera electronics, or optionally one or more dedicated heaters within infrared camera 10.

As indicated above, in one example, rain or other environmental factors may cool down housing 15, which may create a vacuum or low pressure area inside housing 15. To equalize the pressure inside housing 15, moist air may be drawn into the interior of housing 15 where the moisture may condense and eventually cause corrosion to form on sensitive electronic components (e.g., heating element 50(d)). In order to reduce or eliminate moisture drawn into housing 15 during the pressure equalization process, as an example for one embodiment, humidity reduction system 20 may switch on one or more heating elements 50(a)-50(d) to produce heat within housing 15 to reduce the humidity (e.g., humidity 70) and drive out moisture via vent 60.

In general, vent 60 may represent any type of vent that allows moisture to pass through and out of housing 15 of infrared camera 10. In one embodiment as an example, vent 60 may represent a microporous ePTFE (expanded PolyTetraFluoroEthylene) membrane permeable to moisture and vapor. For example, vent 60 may allow housing 15 to equalize pressure to prevent the further ingress of moisture and to preserve the integrity of the electronic components inside housing 15.

In an example of a conventional passive venting system, the venting mechanism, which allows moisture to escape from the housing, occurs after pressure has increased to a predetermined level. The increase or rise in pressure typically occurs over a period of time as heat is generated during normal operation of the electronic equipment. If the equipment is operated for short periods of time or infrequently, pressure inside the electronic enclosure may not increase to a level sufficient to permit sufficient venting to occur. Accordingly, any moisture within the housing will remain in the housing where it may eventually corrode sensitive electronics. Over time, such incremental but insufficient increases in pressure may cause significant amounts of moisture or vapor to accumulate inside the housing, which may result in failure of the electronics.

In contrast to conventional passive venting schemes used with infrared cameras, venting and humidity control according to one embodiment described herein is due to active humidity control systems and methods (e.g., humidity reduction system 20). In this regard, humidity levels (e.g., humidity level 70) within housing 15 are communicated by sensor 65

(e.g., via sensor signal 30) to logic circuit 40, which determines if the humidity level is within an acceptable humidity range or should be adjusted. In general for example, if the humidity level should be adjusted, logic circuit 40 communicates a control signal 33 to activate (switch on) one or more heating elements 50(a)-50(d) and/or power unit 45 (if required) as needed to increase heat within housing 15 to reduce humidity levels or deactivate (switch off) if permitted one or more heating elements 50(a)-50(d) and/or power unit 45 (if required) as needed to decrease heat within the housing 15.

Figure 3:
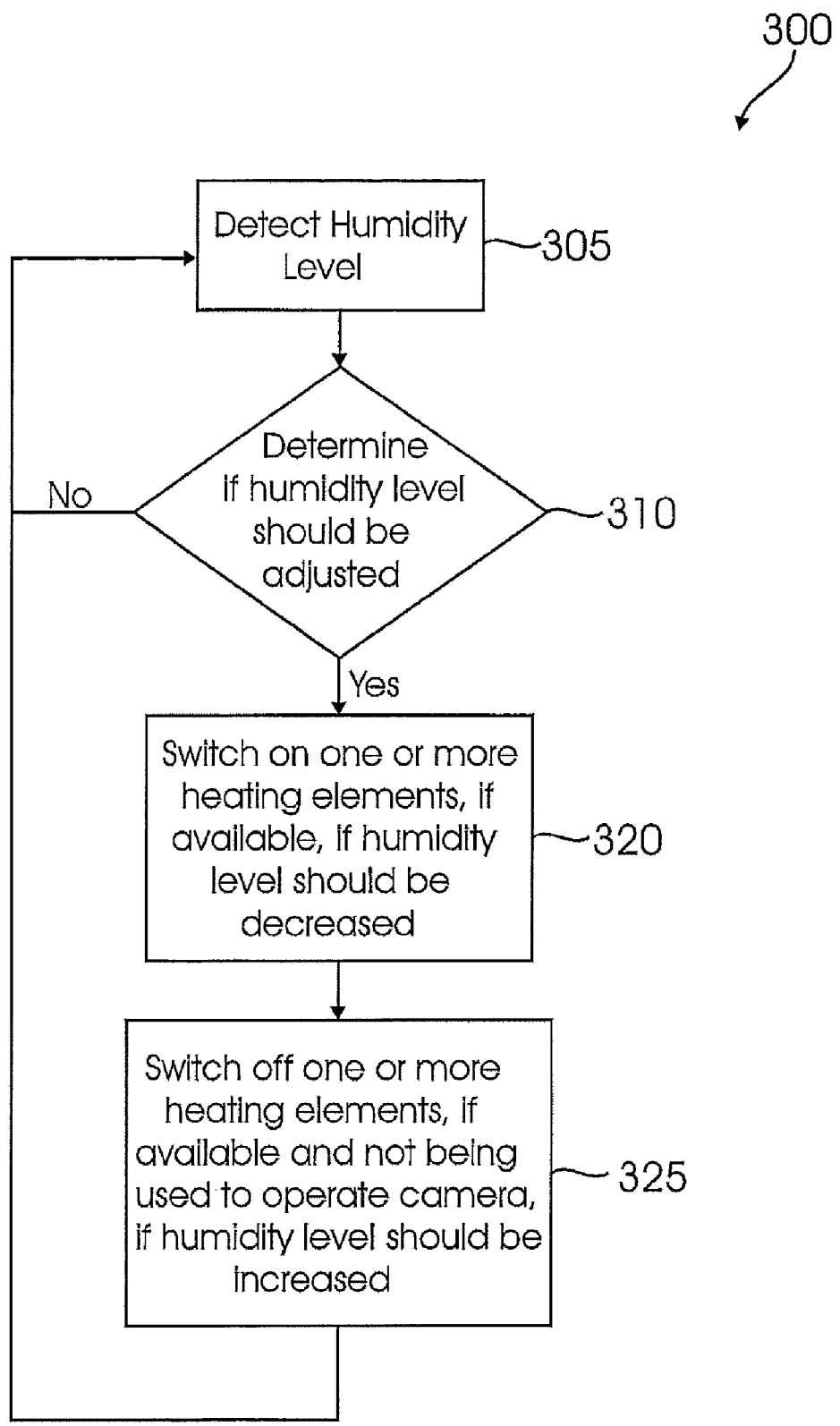
FIG. 3 is a flowchart showing a method of humidity reduction, such as for the infrared camera of FIG. 1, in accordance with one embodiment.

For example as generally illustrated in FIG. 3, a flowchart 300 shows a humidity control method in accordance with one embodiment. Sensor 65 detects a humidity level within housing 15 (block 305) and communicates this humidity level information (e.g., as sensor signal 30) to logic circuit 40. Logic circuit 40 determines if the humidity level within housing 15 should be adjusted (block 310). If humidity level 70 is within an acceptable humidity range, no action is taken by logic circuit 40 and sensor 65 continues to provide humidity level information (block 305). On the other hand, if the humidity level within housing 15 is above the acceptable humidity range and should be decreased, logic circuit 40 may then switch on, if available, one or more heating elements 50(a)-50(d) (block 320).

As a specific example, logic circuit 40 may switch on the heater for the infrared (IR) window (e.g., heating element 50(b)), if not already switched on, and continue to monitor the humidity level. If heating element 50(b) is already switched on, then logic circuit 40 may switch on the IR lens heater (e.g., heating element 50(a)), the dedicated heater (e.g., optional heating element 50(c)), and/or the camera electronics (e.g., heating element 50(d)), which may be determined in a priority order. If the humidity level does not decrease sufficiently over a desired time period, logic circuit 40 may further switch on, if available, one or more from among additional heating elements 50(a), 50(c), and 50(d).

If the humidity level within housing 15 is below the acceptable humidity range and should be increased, logic circuit 40 may then switch off, if available and permitted, one or more heating elements 50(a)-50(d) (block 325). As a specific example, camera electronics (e.g., heating element 50(d)) would generally control whether itself or other heating elements 50(a), 50(b) should be switched on to function for their intended purposes. However if these components are switched on but not required, logic circuit 40 may be permitted to switch off one or more of these components to reduce the generation of heat. Furthermore, logic circuit 40 may control and switch off the dedicated heater (e.g., optional heating element 50(c)), if implemented and switched on, to reduce the amount of heat generated within housing 15 and allow the humidity level to possibly increase.

Figure 4:
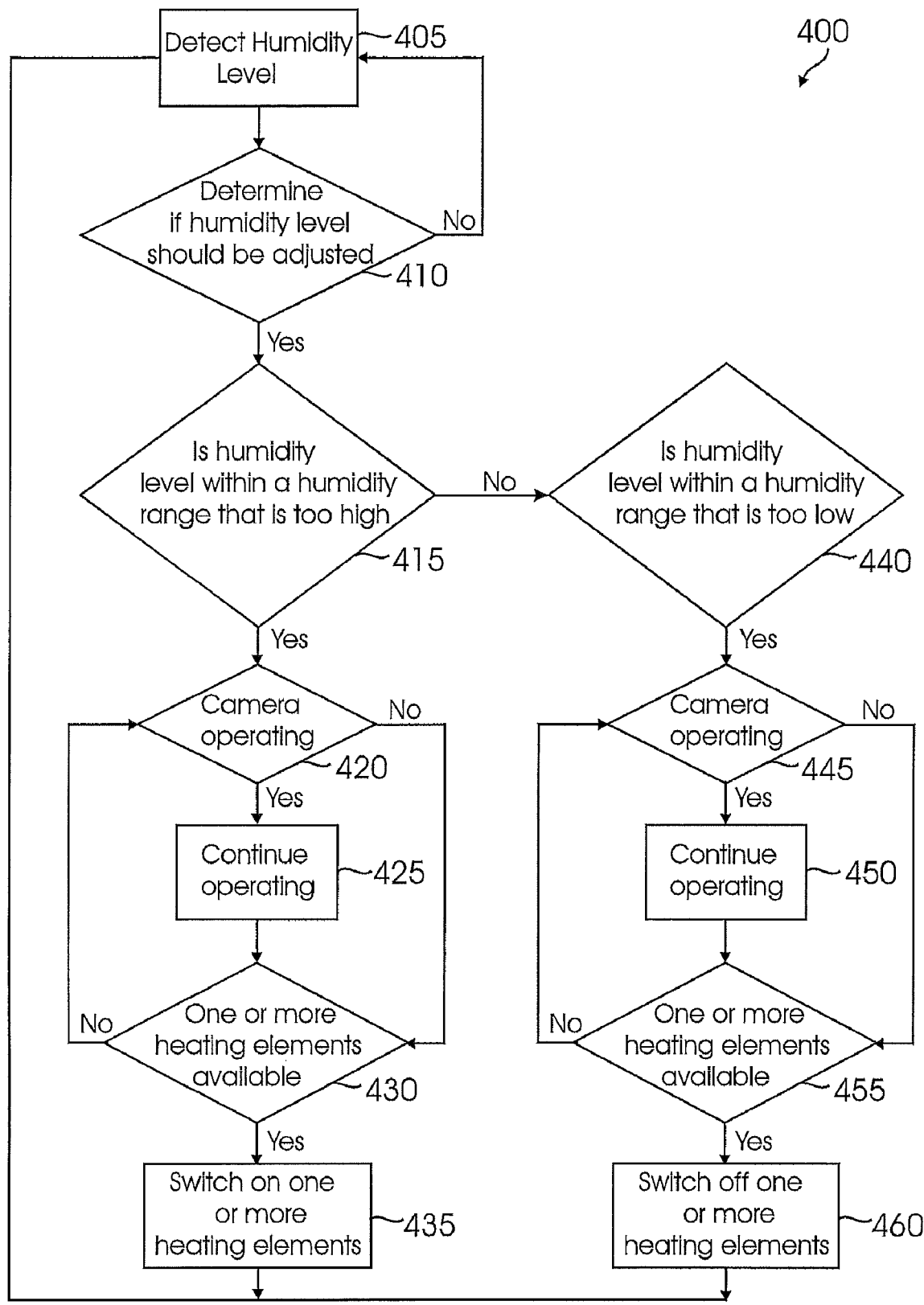
FIG. 4 is another flowchart showing a method of humidity reduction, such as for the infrared camera of FIG. 1, in accordance with one embodiment.

More specifically, FIG. 4 is a flowchart 400 illustrating a humidity reduction method in accordance with one embodiment. Sensor 65 detects humidity levels within housing 15 (block 405) and provides this information (e.g., via sensor signal 30) to logic circuit 40. Logic circuit 40 determines if the humidity level within housing 15 should be adjusted (block 410) based on the information from sensor 65.

Typically for example, electronic components are designed to operate most efficiently within a certain acceptable humidity range. Persons of ordinary skill in the art will understand that an acceptable humidity range for any electronic component and/or system may vary and will depend on various factors including component/system configuration, material construction, and intended application, to name a few. As indicated above, humidity levels that are too high may cause, for example, corrosion to form on components, while too low a humidity level may promote, for example, electrostatic discharge between components. As such, humidity levels within housing 15 may be controlled, as described herein, to maintain humidity levels with an acceptable (e.g., desired) humidity range based on the application and/or specific requirements.

In one embodiment, logic circuit 40 bases its determination on an acceptable humidity range and one or more humidity ranges above and below the acceptable humidity range. As indicated above, logic circuit 40 determines whether the humidity level should be adjusted based on the humidity level information provided by sensor 65, with the determination performed continuously or periodically (e.g., at set time intervals). For example, periodic time intervals may permit logic circuit 40 to switch on or switch off heating elements 50(a)-50(d) one at a time to increase heat or decrease heat within housing 15, depending upon the humidity level and the rate of increase or decrease of the humidity level. For example by including a plurality of relatively narrow humidity ranges above and below the acceptable humidity range, logic circuit 40 may incrementally switch on or switch off selectively heating elements 50(a), 50(b), 50(c), and/or 50(d) to gradually control the humidity level. In this regard, a gradual control of the humidity level permits logic circuit 40 to compensate for any system hysteresis which may result from a lag that occurs between the application and removal of heat and its subsequent effect.

As shown in FIG. 4, if it is determined (block 410) that the humidity level (e.g., humidity level 70) within housing 15 is within an acceptable humidity range, sensor 65 continues to detect the humidity levels (block 405). If the humidity level within housing 15 is greater than the acceptable humidity range (block 415), it is then determined if infrared camera 10 is operating (block 420). If infrared camera 10 is operating, infrared camera 10 continues to operate (block 425) and a determination is made as to whether one or more heating elements 50(a)-50(d) are available to provide additional heat (block 430). If one or more heating elements 50(a)-50(d) are available, logic circuit 40 switches on one or more of heating elements 50(a)-50(d) to provide heat within housing 15 (block 435) to decrease the humidity level. In this regard, an optional or dedicated heater (heating element 50(c)) may also be included in humidity reduction system 20 to provide additional heat when all other heating elements are being utilized during operation of infrared camera 10.

If infrared camera 10 is not operating, as determined at block 420, the determination is still made as to whether one or more heating elements 50(a)-50(d) are available to provide heat (block 430). Generally, if infrared camera 10 is not operating, one or more heating elements 50, including the lens heater (heating element 50(a)) and the window heater (heating element 50(b)), will be available to provide heat and may be switched on by logic circuit 40, but logic circuit 40 generally may not interfere with infrared camera operation if infrared camera 10 is operating. In one embodiment if infrared camera 10 is not operating, other infrared camera electronics (heating element 50(d)) may be switched on to a standby mode by logic circuit 40 to provide heat, or, as indicated above, optional heater 50(c) may be further employed to provide heat within housing 15.

In one embodiment, if it is determined that the humidity level should be adjusted and the humidity level is too low (block 440), it is then determined if infrared camera 10 is operating (block 445). If infrared camera 10 is operating, infrared camera 10 continues to operate (block 450). However, whether or not infrared camera 10 is operating, a determination is made as to whether one or more heating elements 50(a)-50(d) are available to be switched off (block 455). If available, one or more heating element(s) 50 are switched off as needed (block 460) by logic circuit 40 (e.g., if switching off one of heating elements 50 (e.g., 50(*a*), 50(*b*), 50(*c*), or 50(*d*)) interferes with infrared camera 10 operation, then this heating element 50 is not available and is not switched off by logic circuit 40, regardless of the humidity level). In general as an example, general operation of infrared camera 10 (e.g., as controlled by the camera electronics (heating element 50(*d*))) takes priority over logic circuit 40 as to control of heating elements 50 (e.g., logic circuit 40 will not override control or commands provided by the camera electronics.

Accordingly, humidity reduction system 20 may act as an active closed loop control system, for example in one embodiment, that controls the activation or deactivation of various heaters or heat generating elements (e.g., heating elements 50(*a*)-50(*d*)) within housing 15 to maintain a humidity level within a desired range.

In another embodiment, logic circuit 40 may provide a control signal 35 to power unit 45 to permit one or more power supply circuits to supply power 25 to one or more heating elements 50(*a*)-50(*d*) to permit activation or deactivation of the one or more heating elements 50(*a*)-50(*d*) as needed. Alternatively, power unit 45 may supply power 25 to heating elements 50(*a*)-50(*d*) and logic circuit 40 controls these components directly to switch on or off.

In still another embodiment, the executable instruction set of a microcontroller or similar type of device associated with the general operation of infrared camera 10 (e.g., within the camera electronics) may be expanded to include all or part of the functionality of logic circuit 40. For example, the functionality of logic circuit 40 may be incorporated into the camera electronics, rather than being a separate logic circuit within infrared camera 10. Accordingly, control signals 34 from the camera electronics (heating element 50(*d*)) to one or more heating elements 50(*a*)-50(*c*) may include signals associated with the standard operation of infrared camera 10 and signals associated with humidity reduction system 20.

In another embodiment, logic circuit 40 may be configured to communicate a control signal 36 to vent 60 as may be the case if vent 60 were mechanically operated or similarly structured to operate under control of another device. For example, logic circuit 40 may open vent 60 to allow moisture to escape via vent 60, such as after logic circuit 40 switches on one or more of heating elements 50(*a*)-50(*d*).

In another embodiment, the determination as to whether the humidity level should be adjusted (e.g., block 310 of FIG. 3 or blocks 410, 415, 440 of FIG. 4) may be based on the measured humidity level and/or on temperature, including a rate of change of humidity and/or temperature. For example for an embodiment, an internal moisture condensation point or dew point within infrared camera 10 (FIG. 1) may be a function of infrared camera temperature (e.g., air temperature within housing 15) and internal humidity level (e.g., measured humidity from sensor 65 of FIG. 2). As a specific example, a Magnus-Tetens formula as set forth in equation (1) may be used to calculate a dew point temperature (Td) within infrared camera 10.

$$Td = \frac{b \cdot \alpha(T, RH)}{a - \alpha(T, RH)} \quad (1)$$

$$\alpha(T, RH) = \frac{a \cdot T}{b + T} + \ln(RH),$$

with $a = 17.27$, $b = 237.7$ [° C.], and where T is the measured temperature [° C.], RH is the measured relative humidity, and Td is the calculated dew point temperature [° C.] over the range 0° C.<T<60° C., 0.01<RH<1.00, and 0° C.<Td<50° C. The uncertainty in the calculated dew point temperature may be ±0.4° C.

The measured relative humidity (RH) may be provided by sensor 65 (FIG. 2), which may also represent or include a temperature sensor to provide the measured temperature (T) to logic circuit 40. Alternatively, infrared camera 10 may conventionally monitor internal temperature within housing 15 (e.g., an internal surface, air temperature, or of the electronics themselves within housing 15) and this temperature measurement may be used by logic circuit 40 to calculate the dew point temperature (Td).

Consequently as discussed previously herein (e.g., block 310 of FIG. 3 or blocks 410, 415, 440 of FIG. 4), a determination may be made as to whether to actively change the humidity level based upon a measured humidity level (e.g., a maximum level of humidity allowed inside infrared camera 10). Alternatively, this determination (e.g., block 310 of FIG. 3 or blocks 410, 415, 440 of FIG. 4) as to whether to actively change the humidity level may be based (additionally or alternatively) on the calculated dew point temperature (Td). For example, if the temperature-based humidity level threshold (i.e., dew point calculation based) is above the default (set) maximum humidity level, then the default maximum humidity level threshold may be used. However, if the temperature-based humidity level threshold (i.e., dew point calculation based) is below the default (set) maximum humidity level, then the temperature-based humidity level threshold (i.e., dew point calculation based) may be used as the threshold. As another example, if the measured temperature (T) is at or below the calculated dew point temperature (Td), then action may be taken to decrease the humidity level (e.g., block 320 of FIG. 3 or block 415 of FIG. 4).

Additionally in accordance with one or more embodiments, rate of change equations and calculations may be used to determine the future dew point-based humidity level (e.g., logic circuit 40 may calculate and/or forecast), as would be understood by one skilled in the art. For example, logic circuit 40 may respond to a forecast situation of the dew point-based humidity level changing such that it will rise above a set maximum default humidity level by taking action, as discussed herein, to reduce the humidity level. As another example, logic circuit 40 may monitor the temperature (T) and, based on the calculated dew point temperature (Td) and the forecast situation for the temperature (T) and the calculated dew point temperature (Td), begin to take action (e.g., to reduce the humidity level as discussed herein, such as to maintain the temperature (T) above the calculated dew point temperature (Td)). Thus, logic circuit 40 may perform, for example, forecasting (e.g., using rate equations and control algorithms) to monitor conditions within infrared camera 10 and act according to the forecast to maintain desirable humidity levels.

Although the method(s)/step(s) are illustrated and described herein as occurring in a certain order, the specific order, or any combination or interpretation of the order, is not required. In general, embodiments described above illustrate but do not limit the invention. It should also be understood that numerous modifications and variations are possible in accordance with the principles of the present invention. Accordingly, the scope of the invention is defined only by the following claims.

What is claimed is:

1. An infrared camera comprising:
a housing having disposed therein;
one or more heating elements;
a vent;
a sensor for detecting a humidity level and providing a sensor signal indicating the humidity level within the housing; and
a logic circuit configured to receive the sensor signal and determine if the humidity level within the housing should be reduced, wherein the logic circuit provides a control signal to switch on at least one of the heating elements if the humidity level should be reduced via the vent.

2. The infrared camera of claim 1, wherein the logic circuit further determines whether the humidity level should be increased, and wherein the logic circuit provides the control signal to switch off at least one of the heating elements if the humidity level should be increased.

3. The infrared camera of claim 1, wherein the vent is adapted to allow moisture and/or vapor to travel out of the housing.

4. The infrared camera of claim 1, wherein the logic circuit switches on all of the heating elements if the humidity level is above a certain threshold level and should be reduced.

5. The infrared camera of claim 1, wherein the logic circuit is a microcontroller.

6. The infrared camera of claim 1, wherein the sensor is a capacitive humidity sensor or a resistive humidity sensor.

7. The infrared camera of claim 1, wherein the one or more heating elements comprises camera electronics and an infrared window heater.

8. The infrared camera of claim 7, wherein the one or more heating elements further comprises an infrared lens heater.

9. The infrared camera of claim 7, wherein the one or more heating elements further comprises a dedicated heater.

10. The infrared camera of claim 1, further comprising a power supply, and wherein the logic circuit is further configured to control the power supply to switch on the one or more heating elements.

11. The infrared camera of claim 1, wherein the logic circuit is further configured to control activation of the vent.

12. The infrared camera of claim 1, wherein the logic circuit calculates a dew point temperature to compare to a temperature within the infrared camera to determine if the humidity level within the housing should be reduced.

13. The infrared camera of claim 12, wherein the logic circuit uses rate of change equations to determine whether to provide the control signal to switch on at least one of the heating elements to reduce the humidity level.

14. A method of controlling a humidity level within an infrared camera, the method comprising:
detecting the humidity level within the infrared camera;
determining if the detected humidity level should be adjusted; and
switching on at least one heating element within the infrared camera if the humidity level is to be reduced based on the determining.

15. The method of claim 14, further comprising switching off at least one of the heating elements within the infrared camera if the humidity level is to be increased based on the determining.

16. The method of claim 14, further comprising venting humidity out of the infrared camera based on the switching on of the at least one heating element.

17. The method of claim 14, wherein the infrared camera includes a plurality of the heating elements, and wherein the heating elements comprise an infrared window heater, an infrared lens heater, and camera electronics.

18. The method of claim 17, wherein the heating elements further comprise a dedicated heater.

19. The method of claim 14, wherein the determining further comprises:
calculating a dew point temperature; and
comparing to a measured temperature within the infrared camera.

20. The method of claim 19, wherein the determining further comprises calculating a rate of change of the measured temperature and/or the humidity level.

21. An infrared camera comprising:
a housing;
a vent coupled to the housing;
means for detecting a humidity level within the housing;
means for generating heat within the housing;
means for determining if the humidity level within the housing should be adjusted based on information provided by the detecting means, wherein the determining means provides a control signal to switch on the heat generating means if the humidity level should be reduced.

22. The infrared camera of claim 21, wherein the determining means further provides the control signal to switch off the heat generating means if the humidity level should be increased.

23. The infrared camera of claim 21, wherein the vent is adapted to allow moisture and/or vapor to travel out of the housing.

24. The infrared camera of claim 21, wherein the heat generating means comprises an infrared lens heater, an infrared window heater, camera electronics, and a dedicated heater.

25. The infrared camera of claim 21, further comprising means for detecting a temperature within the housing, wherein the determining means is further adapted to adjust the humidity level within the housing based on information provided by the temperature detecting means.

* * * * *